F. W. HARRIS.
PROTECTIVE DEVICE FOR ELECTRIC APPARATUS.
APPLICATION FILED MAY 6, 1907.

963,762.

Patented July 12, 1910.
3 SHEETS—SHEET 2.

F. W. HARRIS.
PROTECTIVE DEVICE FOR ELECTRIC APPARATUS.
APPLICATION FILED MAY 6, 1907.

963,762.

Patented July 12, 1910.

3 SHEETS—SHEET 3.

UNITED STATES PATENT OFFICE.

FORD W. HARRIS, OF WILKINSBURG, PENNSYLVANIA, ASSIGNOR TO WESTINGHOUSE ELECTRIC & MANUFACTURING COMPANY, A CORPORATION OF PENNSYLVANIA.

PROTECTIVE DEVICE FOR ELECTRIC APPARATUS.

963,762.  Specification of Letters Patent.  Patented July 12, 1910.

Application filed May 6, 1907. Serial No. 372,206.

*To all whom it may concern:*

Be it known that I, FORD W. HARRIS, a citizen of the United States, and a resident of Wilkinsburg, in the county of Allegheny and State of Pennsylvania, have invented a new and useful Improvement in Protective Devices for Electric Apparatus, of which the following is a specification.

My invention relates to the automatic protection of electrical apparatus, and has for its object to provide means for automatically interrupting electric circuits under predetermined conditions of load and temperature in the protected apparatus.

It is a well known fact that electrical apparatus, in general, is capable of sustaining a considerable over-load for a relatively short time without injury while the continuous application of much smaller electric currents may cause material damage. The protective device of my present invention is responsive to heat variations produced in a given element by reason of the passage of electric currents therethrough and, by connecting this thermo-responsive element in series with the supply circuit of translating devices or other electric apparatus which it is desired to protect, a circuit interrupter of any well known type may be automatically actuated when the current supply is too great or continues for too long a time.

Figure 1:
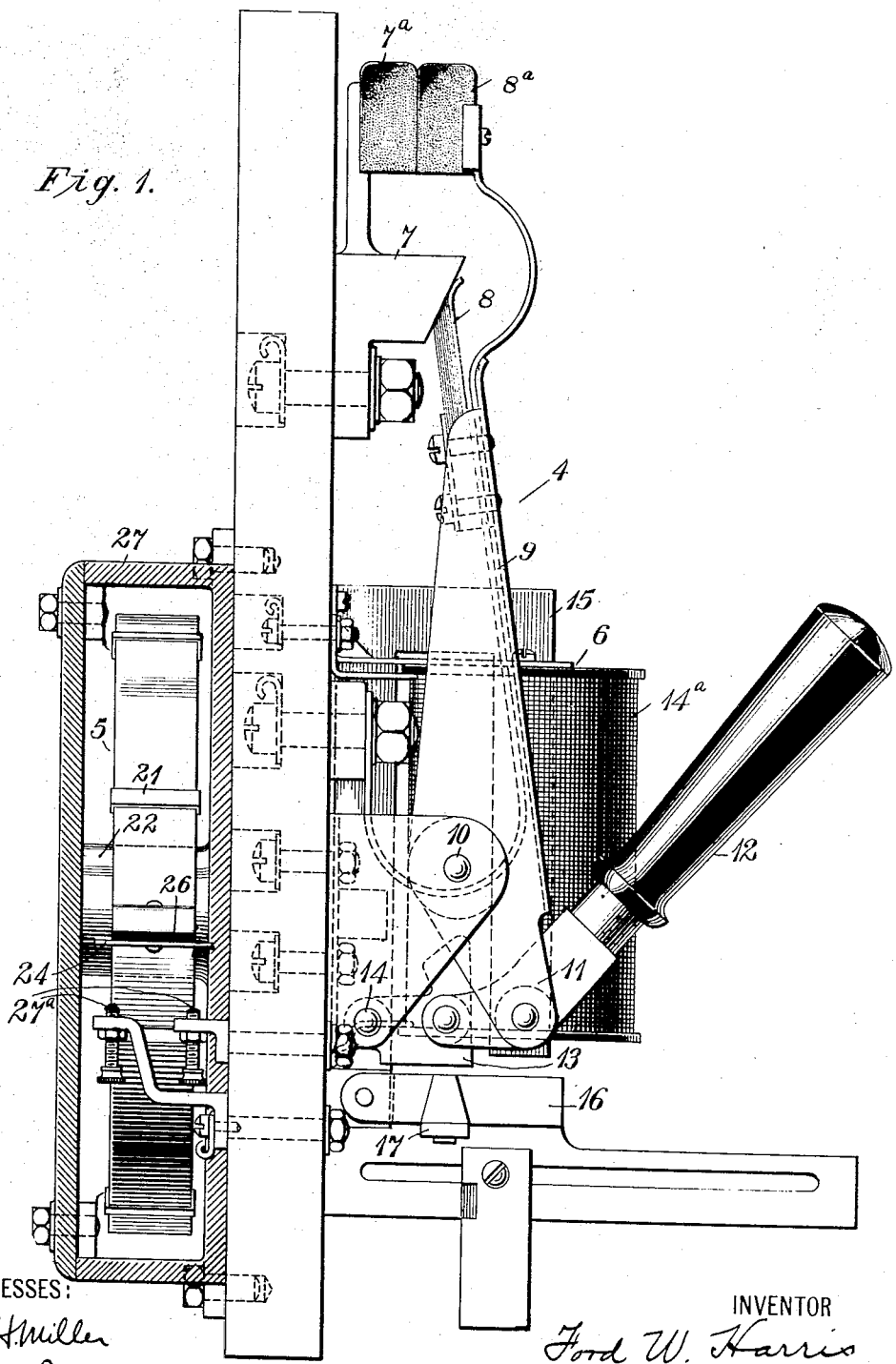
Figure 2:
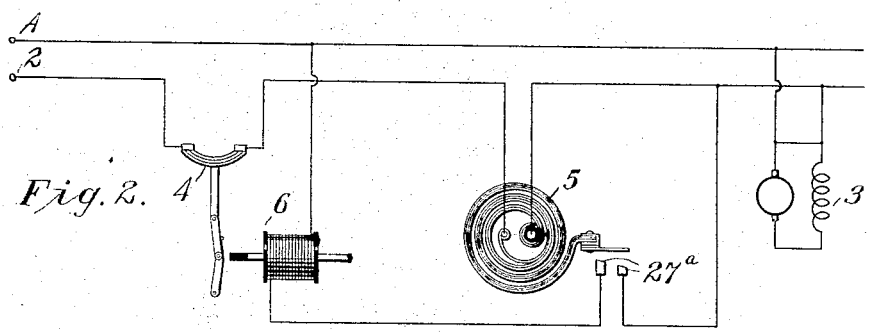
Figure 3:
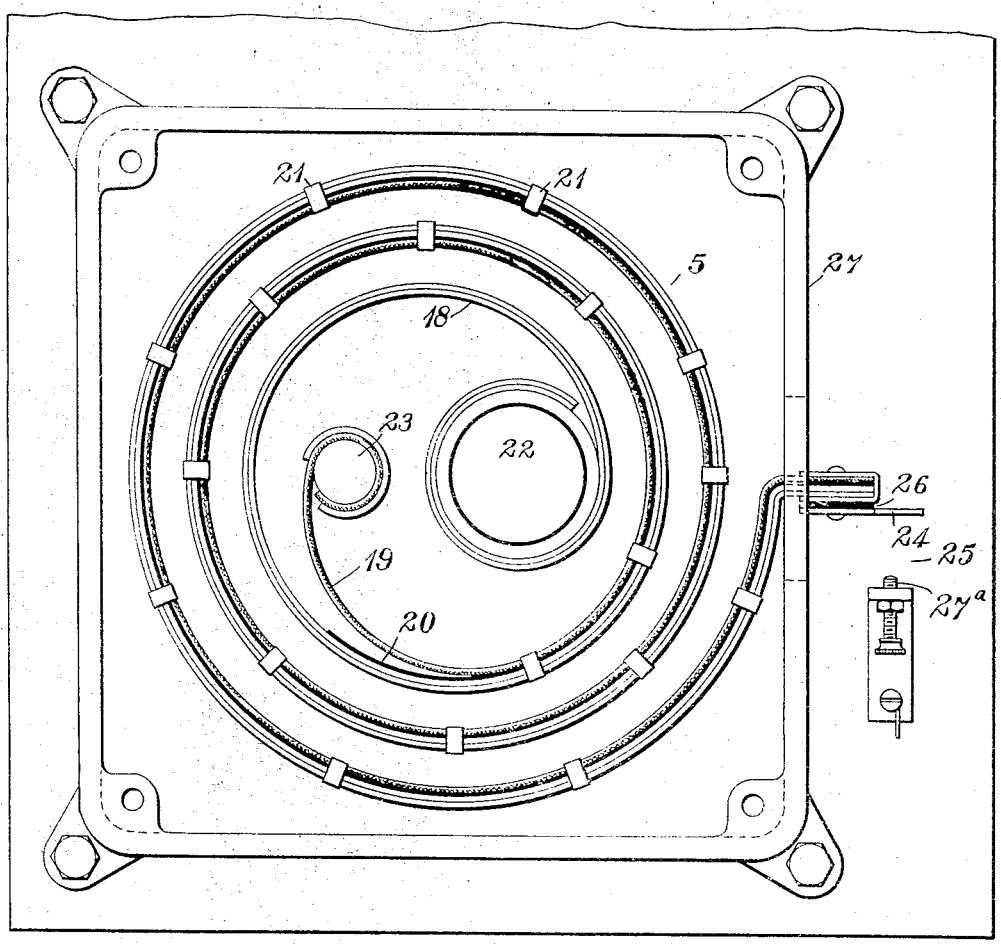
Figure 4:
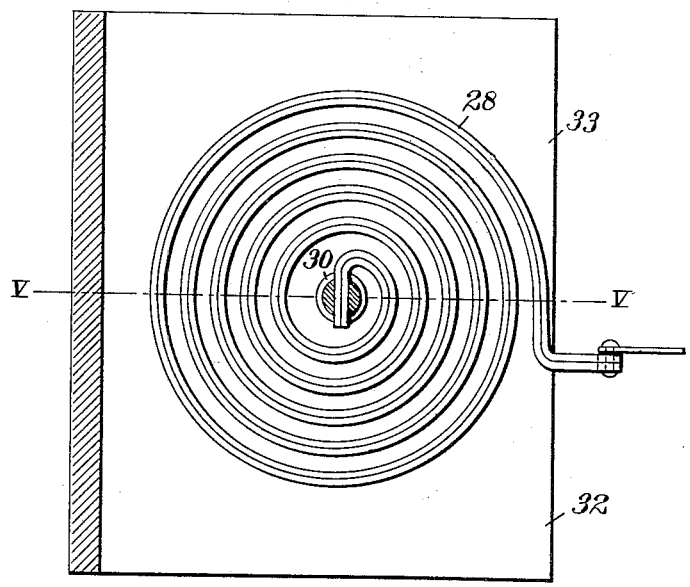
Figure 5:
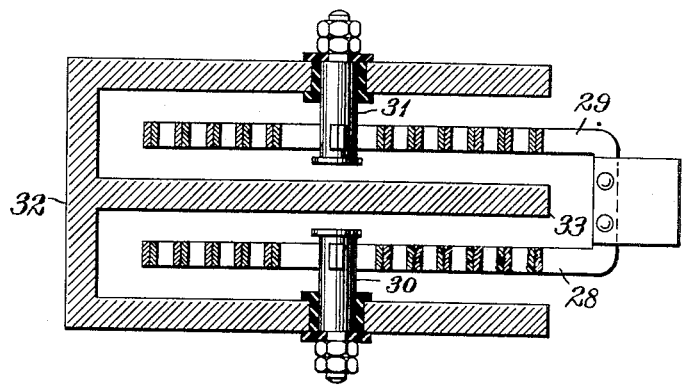

Figure 1 of the accompanying drawings is a side elevation of an automatic circuit interrupter which is equipped with the thermo-responsive tripping device of my invention. Fig. 2 is a diagrammatic view of the circuit connections of a system of distribution embodying my invention. Fig. 3 is a back view, with the cover removed, of the device shown in connection with the circuit-breaker of Fig. 1. Fig. 4 is a view of a modified form of a heat-responsive device, and Fig. 5 is a sectional view on the line V—V of Fig. 4.

Referring to Figs. 1, 2 and 3 of the drawings, electrical energy is supplied from any convenient source through a circuit 1—2 to an electric motor 3 or other translating device. The line conductor 2 is interrupted to receive a circuit-breaker 4 and a thermo-responsive device 5 in series relation. The circuit-breaker 4 is provided with a release magnet 6, the coil of which may be energized from the circuit 1—2 under certain conditions to be hereinafter specified. The circuit-breaker 4 comprises stationary contact members 7 and 7ª and coöperating movable members 8 and 8ª attached to the outer extremity of an arm 9 which is pivotally mounted upon a pin 10 as an axis. The arm 9 is provided with a heel projection 11 which is connected to an intermediate point in a handle lever 12. The inner end of the handle lever 12 is connected to one end of a link 13, the opposite end of which is pivotally mounted on a stationary pin 14 as an axis. The tripping magnet 6 comprises a winding 14ª, a stationary core member 15 which is influenced by the winding and a movable core member 16 having a projection 17 which serves to trip the interrupter and open the circuit.

Since circuit interrupters of the class shown are well known in the art, I deem it unnecessary to describe more fully the details of construction or operation. A circuit-breaker of this type is illustrated and described in Patent No. 797,048, granted August 15, 1905, to the Westinghouse Electric & Manufacturing Company, as assignee of Harry P. Davis and Arthur B. Reynders. The heat-responsive device or thermostat 5 has the form of a resilient spiral which is composed of a two-part strip or ribbon 18 having considerable elasticity and a flexible conducting strip 19 which is electrically separated from the two-part strip 18 by an insulating ribbon 20 and is mechanically attached thereto by a plurality of clasps 21. At its inner end, the spiral is divided into two parts which are attached to separate studs or terminal posts 22 and 23 and at its outer end, the spiral is provided with the movable contact member 24 of a relay switch 25, said movable member being insulated from the spiral by a block 26. The strip 18 may preferably comprise two conducting strips having unlike co-efficients of expansion, such as German silver and copper, riveted together. The spiral may be provided with an inclosing casing 27, but it is essential that a free movement of the outer turns of the spiral shall be permitted.

When electrical energy is supplied to the translating device 3 through the circuit interrupter 4 and the spiral 5, the temperature of the latter will be increased, the increase being dependent upon the amount and extent of the flow of the electric current through the conducting strips and upon the amount of radiation. An increase in the temperature of the spiral gives its outer extremity a movement substantially in the arc of a circle, by reason of the unequal expansion of the materials of which the strips are made. A predetermined degree of movement of the outer end of the spiral will effect closure of the relay switch 25 by reason of the engagement of the contact member 24 with a pair of stationary adjustable contact members 27ª. When the relay switch is closed, energy is supplied to the coil 14ª of the tripping magnet 6 and the circuit is interrupted by the breaker.

By a suitable arrangement of parts and a selection of materials, the thermostat 5 may be adapted to thoroughly protect the motor 3 or some other translating device without unnecessarily interrupting its supply circuit.

Referring to Figs. 4 and 5, the thermostat here shown comprises two spirals 28 and 29 which are similar to the two-part spiral 18 and comprise resilient conducting strips the outer ends of which are joined together and the inner ends of which are connected, respectively, to studs or terminal posts 30 and 31. These terminal posts are supported in the walls of a box 32 of magnetizable material which is provided with a middle partition 33 that projects between the spirals 28 and 29. When electric current passes through both of the spirals in series, an interrupted line conductor being connected to the terminal posts 30 and 31, a magnetic field is produced in the walls and partition of the magnetizable box 32. The magnetic field thus established tends to produce a movement of the outer ends of the spirals in the same direction as that produced by the heat expansion of the conductors of which they are formed. By attaching a movable contact member to the junction of the two spirals and suitably locating stationary contact members to coöperate therewith, an automatic circuit interrupter may be actuated by the passage of current through the thermostat, an additional advantage being secured by reason of the fact that the auxiliary circuit completed through the contact members will be immediately interrupted when the main circuit is opened, by reason of the disappearance of the magnetic field already described.

By properly proportioning the device of Figs. 4 and 5, the circuit may be interrupted by the electro-magnetic action alone when the current flowing through the spirals exceeds a predetermined amount.

I claim as my invention:

1. In a circuit interrupter, the combination with an insulating slab or plate, a pair of contact terminals, a movable bridging contact member pivotally secured to one of said terminals and latching and tripping mechanism, of a current-conducting spiral surrounding one of the contact terminals at the rear face of the plate or slab and connected thereto in series circuit relation for automatically actuating the tripping mechanism.

2. In a circuit interrupter, the combination with an insulating plate or slab, stationary terminal members secured thereto and extending therethrough, a bridging contact arm pivotally secured to one of said terminals, a latch, a tripping magnet therefor, and a thermo-responsive current-conducting spiral surrounding one of the terminal members and connected thereto in series circuit relation at the back of the plate or slab for closing the circuit of the tripping magnet under abnormal current conditions in the main circuit.

3. In a circuit interrupter, the combination with an insulating plate or slab, a pair of stationary terminal members secured thereto and extending therethrough, a bridging contact member pivotally secured to one of the terminal members on the face of the plate or slab, a latch, a tripping magnet therefor and a thermostat comprising a conducting spiral surrounding one of the terminal members at the back of the plate or slab and connected thereto in series circuit relation for automatically energizing the tripping magnet.

4. A thermostatic device comprising a pair of terminal members and a spiral surrounding said terminal members and having a plurality of turns of strap conductors and a like number of turns of ribbon conductor connected to the strap conductors at the outer end of the spiral and insulated therefrom throughout their lengths, said strap conductors being connected to one of said terminal members and said ribbon conductor to the other terminal member.

In testimony whereof, I have hereunto subscribed my name this 30th day of April, 1907.

FORD W. HARRIS.

Witnesses:
J. A. Dow,
BIRNEY HINES.